Oct. 20, 1959     H. T. KRAFT     2,909,244
VEHICLE SUSPENSION AND BRAKE SYSTEM
Filed July 5, 1957
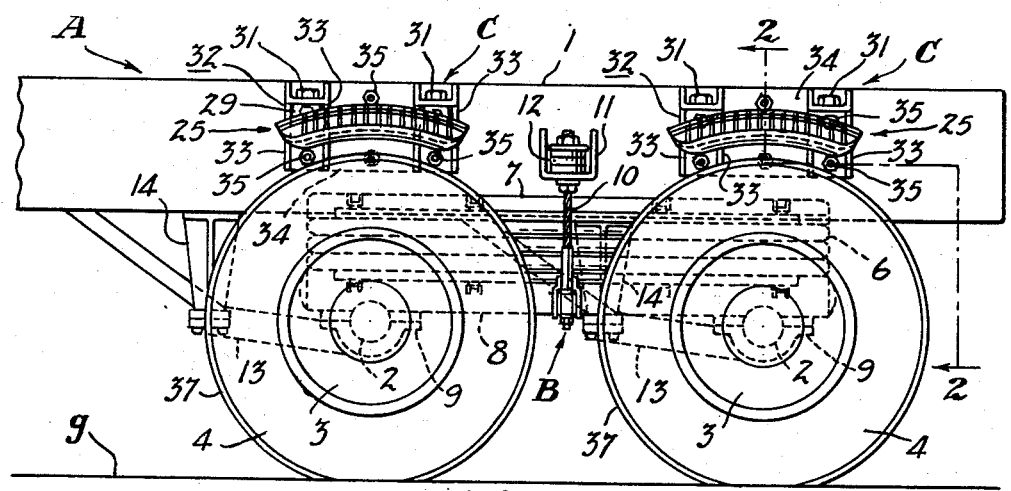
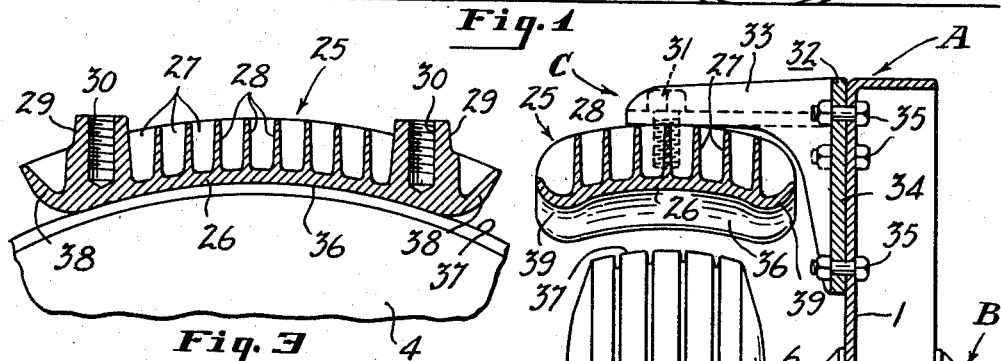
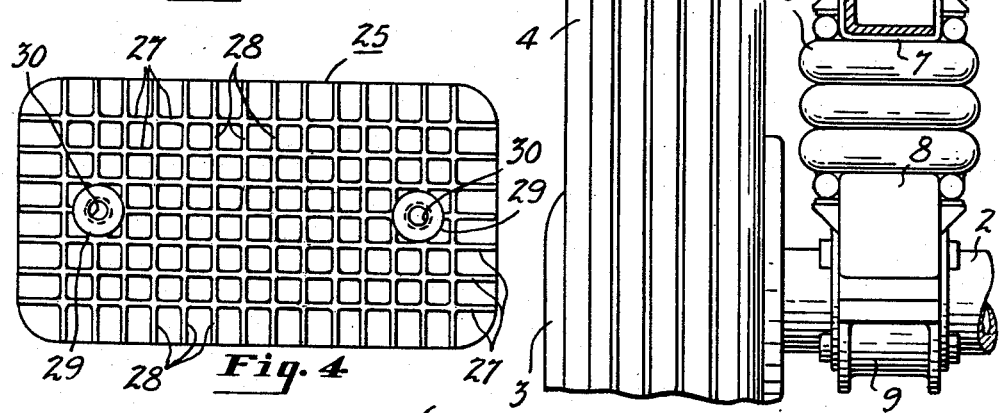
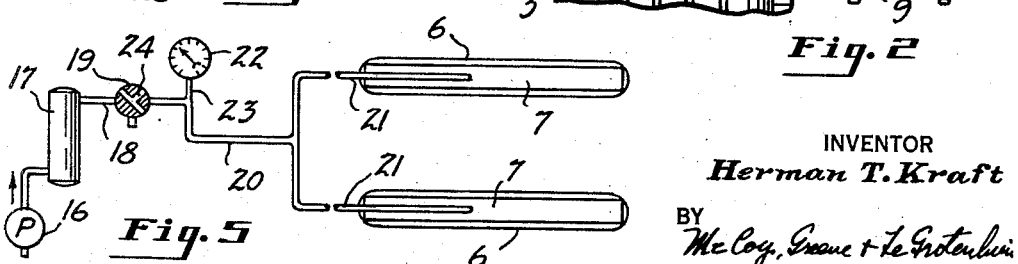
INVENTOR
*Herman T. Kraft*
BY
ATTORNEYS United States Patent Office 2,909,244
Patented Oct. 20, 1959

2,909,244

VEHICLE SUSPENSION AND BRAKE SYSTEM

Herman T. Kraft, Akron, Ohio, assignor to The General Tire & Rubber Company, Akron, Ohio, a corporation of Ohio Application July 5, 1957, Serial No. 670,235

2 Claims. (Cl. 188—29)

The present invention relates to a metal brake shoe of high heat conductivity, adapted to engage the tread portion of a pneumatic tire, and more particularly to an emergency brake for trailers.

Heretofore there have been many accidents caused by the failure of the conventional brakes of trucks, trailers, and other vehicles. Manual emergency brakes have been provided, in conjunction with the conventional hydraulic brakes, to provide braking when there was loss of hydraulic fluid. However, this did not solve the problem for heavy trucks and trailers where brake failures were more often due to worn out or faulty brake linings.

Tire-engaging brakes have been employed on bicycles and other extremely light vehicles but, prior to this invention, have not been considered practical for heavy vehicles probably due to the damage done to the tires and the uneven braking action of known types of tire brakes.

The present invention provides an emergency brake which does not damage the tires excessively even when braking at high speeds and which may be used on the heavy vehicles, particularly truck trailers carrying heavy loads. According to the invention, a brake shoe is provided which is shaped to conform substantially to the shape of the tread portion of its associated tire. The shoe is cast of a heat conductive metal, such as copper or the like, to form a multiplicity of cooling fins so as to carry away effectively the heat generated when the brake is moved against the tire. Means may be provided to control movement of each brake shoe against the tire and for regulating the movement of several brake shoes and the braking pressure thereof so as to effect even braking of several wheels.

An object of the invention is to provide a simple, inexpensive, emergency brake for the wheels of a motor vehicle which operates against the tires of the vehicle and does not damage the tires.

A further object of the invention is to provide a tire-engaging brake for a vehicle having means for controlling the amount of pressure applied to the brake.

Other objects, uses and advantages of the present invention will become apparent from the following description and claims and from the drawings, in which:

Figure 1 is a fragmentary side elevational view on a reduced scale, with parts omitted, showing a trailer having mounted thereon emergency brake assemblies constructed according to the present invention, the parts being shown in their normal positions;

Figure 2 is a fragmentary transverse vertical sectional view with parts omitted, taken substantially on the line indicated at 2—2 in Fig. 1, and on a larger scale;

Figure 3 is a fragmentary longitudinal vertical sectional view on a reduced scale, with parts omitted, showing the brake shoe as it appears when in engagement with the tire;

Figure 4 is a top plan view of the brake shoe of Figs. 2 and 3, on a reduced scale; and Figure 5 is a diagrammatic view showing the control means for the air cushions, including the air supply tank and the control valve.

Referring more particularly to the drawings, which are drawn substantially to scale and in which like parts are identified by the same numerals throughout the several views, Figs. 1 and 2 show a trailer or semitrailer having a rigid metal frame A including a pair of parallel longitudinal side channels 1, which are rigidly connected by the conventional crossbeams (not shown) to form an integral construction, the rear end only of the trailer being shown in Fig. 1. The running gear for the trailer includes parallel tandem axles 2, each having a pair of rotatable wheels 3 mounted thereon, a conventional pneumatic rubber tire 4 being mounted on each wheel in the usual manner.

At each side of the vehicle, a pneumatic suspension unit B is interposed between one of the side channels 1 and the axles 2, the two pneumatic cushion units thus being disposed in spaced parallel relation and serving to connect the axles 2 adjacent their ends to retain them in substantially parallel relation. The cushion units B and the other elements of the vehicle suspension are identical to those shown in U.S. Patent No. 2,742,301, granted April 17, 1956.

Each of the units B comprises an air cushion 6 made up of three superposed elongated cells of cord-reinforced rubber, an upper channel member 7 bonded to the upper cell and extending the full length of the cushion, and a hollow side frame member 8 bonded to the bottom cell of the cushion and extending the full length of the cushion.

The frame member 8 is in the form of an air box in communication with the interior of the cushion 6 and is connected to the axles 2 by means including clamping members 9 that extend below the axles. Means is provided for limiting separation of the members 8 and the frame A and for providing fulcrums about which the members 8 may pivot including a pair of expansible metal cables 10 on opposite sides of each cushion 6, as described in greater detail in said Patent No. 2,742,301. The cables 10 are connected at their bottom ends to the member 8 midway between the axles 2 and are connected at their upper ends to the side channels 1, by means of suitable brackets rigidly mounted on said channels. Rubber compression discs 12 are provided between the upper end portion of the cables 10 and the bottom portions of the bracket 11 to take up shock on the cables. Arms 13 are welded to the axles 2 and extend forwardly therefrom in the direction of movement of the vehicle for pivotal connection to the brackets 14 carried by the frame A. The suspension unit permits limited twisting of the arms 13 resulting from traverse of the vehicle over rough roads or terrain and permits slight twisting or distortion of the axles relative to the side frame members 8 as indicated in the aforesaid patent.

The air pressure in the air cushion may be varied to obtain the desired riding qualities with various loads. In order to inflate and deflate the cushion units B, the trailer or the towing tractor is equipped with a pump or other suitable means for supplying air under pressure to the cushion 6. Figure 5 shows schematically how the air may be supplied to the cushion and controlled to regulate the pressure in the cushions.

As herein shown a motor-driven pump 16 is provided for maintaining a substantial superatmospheric air pressure in the supply tank 17, which tank may be mounted in the tractor or the trailer. In certain installations it may be feasible to omit the pump 16 and to fill the supply tank 17 periodically through service station facilities. The supply tank 17 is connected through a tubular conduit 18 to a conventional three-way valve 19 which may be operated manually to control the supplying and exhausting of air. One of the valve outlet ports is connected by a supply conduit 20 and branch conduits 21 to the air cushions 6 of the suspension system, a pressure gauge 22 being connected to the conduit 20 by a tube 23 to indicate to the person turning the valve 19, the air pressure in the two air cushions 6. This structure permits the application of any predetermined pressure to the air cushions so as to facilitate accurate control of the height of the frame A relative to the axles 2. Means may be provided in the cab of the towing tractor to permit control of the valve 19 in the desired manner. Whenever desired, the valve 19 may be turned to a position to exhaust air from the cushions 6 through the passage 24 of the valve to atmosphere.

The valve 19 is adjusted to admit an amount of air to the cushions 6 sufficient to sustain the load being carried by the trailer. The valve may then be closed until such time as additional air pressure is required. For ordinary travel over paved highways the cushions 6 are inflated until the ties or cables 10 are fully extended and under a slight tension, for example, as indicated in Figs. 1 and 2 of the drawings. When the load is lightened, the valve 19 may be turned to exhaust air from the cushions until the pressure in the cushions is proper for the given load. It will be apparent that such a reduction in pressure need not lower the frame A and that an excessive reduction in pressure would lower said frame toward the axles.

According to the present invention, means is provided on the vehicle frame for engaging the tread portions of the tires to brake the vehicle in emergencies when the conventional brakes fail or when additional braking effort is required. It has been discovered that a brake shoe may be formed from copper or similar metal of high heat conductivity which can function effectively as a brake on a pneumatic tire to stop movement of a heavy vehicle, without damaging the tire excessively, even though the vehicle supported by the tire is moving at a very high velocity.

Tests made at tire speeds of over 150 miles per hour have indicated that the brake does not overheat to an extent which could cause failure of the tire.

Figures 2, 3 and 4 are drawn accurately to scale to indicate the structure of a brake shoe constructed according to the present invention. This brake shoe is in the form of a one-piece copper casting and comprises a relatively thin tire-engaging portion 26 having upwardly turned ends 38 and upwardly turned sides 39, and a multiplicity of regularly spaced straight longitudinal and transverse cooling fins 27 and 28, which extend the full length and width of the brake shoe. As herein shown, the brake shoe 25 has seven, regularly spaced, parallel fins 27 and fourteen, regularly spaced, parallel fins 28, each fin being very thin and extending upwardly a substantial distance several times the thickness of the portion 26. The casting is provided with two thickened portions or bosses 29 which are mounted to provide a flat upper surface and internally threaded holes 30 perpendicular to said surface. The threaded holes 30 receive cap screws 31 which serve to support the brake shoe rigidly in position.

A brake assembly C is provided for each wheel 3 to serve as an emergency brake for the trailer. Each assembly C includes a rigid metal bracket 32 having four L-shaped ribs 33 extending transversely away from the adjacent side channel 1, and a flat portion 34 integrally joining said ribs. The portion 34 is flat and is rigidly mounted on the channel 1 by means of six bolts 35. The ribs 33 are shaped so as to permit mounting of the brake shoe 25 in a substantially horizontal position with the portions 26 thereof substantially concentric to the underlying tire 4. The cap screws 31 extend through the bracket 32 and hold the bosses 29 against the bottom of the bracket, as shown in Fig. 2, whereby the brake shoe is rigidly held with respect to the frame A.

Portion 26 of each brake shoe has a smoothly curved bottom surface 36 which is curved longitudinally and transversely so as to conform substantially to the shape of the tread portion of the tire 4 and the outer road-engaging surface 37 of said tread portion. The surface 37 is generally cylindrical and has a uniform axial width throughout the circumference of the tire as in the conventional tire. The radius of longitudinal curvature of the bottom surface 36 of the brake shoe is slightly greater than half the diameter of the road-engaging surface 37 so that the brake shoe conforms to the shape of the brake-engaging portion of the tire when the tire is deformed due to the application of the braking force, substantially more than two-thirds of said bottom surface 36 engaging the tire during the application of the brake so as to provide a maximum braking action. The tire-engaging part of the bottom surface 36 extends the full axial width of the road-engaging surface 37 of the tire and extends longitudinally along the circumference of the tire a distance not materially less (preferably no more than 20% less) than the radius of said surface 37. The brake preferably engages the full width of the surface 37 throughout the length of said tire-engaging part.

It will be apparent from the drawings that four brake shoes 25 are provided above the axles 2, two being located on each side of the vehicle frame A. Each of the brake shoes is located with its center in the medial vertical plane of the underlying tire 4 directly above the axis of rotation of said tire. Each of the shoes 25 is located the same distance above the rigid channel 7 of the adjacent cushioning unit B so that the normal spacing between said brake and the underlying tire is the same for the other three wheels for any given air pressure in the cushioning unit 6.

The brakes 25 normally are located several inches above the tires so that they do not engage the tires during movement of the vehicle. In any emergency, the valve 19 may be turned to a position to exhaust air from the cushions 6 so that the frame A and the brake means C thereon are lowered toward the axles 2. In this way, the brake shoe 25 may be lowered to a braking position against the tires 4 as indicated in Fig. 3. The amount of braking pressure can be regulated closely by the valve 19 using the gauge 22 to indicate the amount of braking pressure. This permits all four of the brake shoes 25 to be lowered simultaneously in unison and to apply the same braking pressure to all four wheels. In this manner, the vehicle may be brought to a stop safely while applying substantially the same braking force to all four wheels. The valve 19 may be controlled so as to avoid skidding on a wet pavement during use of the brakes 25 and permits the application of the correct braking pressure so that the wheels do not lock and so that the tires are not damaged excessively by the brakes.

The shoes 25 preferably are cast from a metal having a heat conductivity not substantially less than that of copper (i.e., about 180 to 240 B.t.u. per hour per foot per degree Fahrenheit) so that the tires will not be damaged excessively by high temperatures at the surface of the brake. It is usually preferable in an emergency brake to omit passages for water or other volatile cooling liquid since there is a danger that the liquid will be evaporated before the brakes are used.

The brake shoe 25 is drawn to scale in Figs. 2, 3 and 4, so that its structure will be apparent to the eye. The ribs 27 and 28 preferably have a thickness of about one-fourth to one-half inch and preferably extend upwardly from the portion 26 about one-and-one-half to three inches. The portion 26 preferably has a substantially uniform thickness of at least about one-third of an inch and not substantially in excess of about two-thirds of an inch.

The brake of the present invention has been illustrated for convenience above the wheels of the vehicle but it could also be mounted between the wheels of a trailer or in various other positions.

It is to be understood that the above description is by way of illustration rather than limitation and that, in accordance with the provisions of the patent statutes, variations and modifications of the specific devices disclosed herein may be made without departing from the spirit of the invention.

Having described my invention, I claim:

1. A multiwheel road vehicle comprising a longitudinally elongated frame, a pair of parallel tandem axles, wheels mounted at the ends of said axles on opposite sides of said frame, toric-shaped pneumatic tires mounted on said wheels, rigid members extending between the axles in spaced relation with respect to one another and in underlying relation to the frame, each of said rigid members being attached near its opposite ends to said axles, deformable air cushions interposed between the rigid members and the vehicle frame, means for supplying air to the air cushions and for exhausting air from said cushions to vary the height of said frame relative to said wheels, a metal brake shoe of high heat conductivity rigidly mounted on said frame above each tire, each brake shoe having a smoothly curved bottom surface shaped to conform substantially to the shape of the tread portion of the underlying tire and generally concentric to said tire and having a multiplicity of upwardly projecting cooling fins, and means for controlling the pressure of the air in said cushions to lower the brake shoes against said tires and to apply a predetermined braking pressure to the tires.

2. A multiwheel road vehicle comprising a longitudinally elongated frame, a transverse axle below said frame, rotatable wheels mounted at the ends of said axle on opposite sides of the frame, inflatable toric-shaped pneumatic rubber tires mounted on said wheels, deformable air cushions interposed between said axles and the vehicle frame, a longitudinally elongated brake shoe formed of a metal having a heat conductivity not substantially less than that of pure coper and rigidly mounted on said frame above each tire, each brake shoe having a relatively thin tire-engaging portion and a multiplicity of thin integral cooling fins projecting upwardly from said portion, said portion having a smoothly curved bottom surface shaped to conform substantially to the shape of the tread portion of the tire so that at least about two-thirds of said bottom surface engages the road-engaging surface of said tire when the brake shoe is moved against the periphery of the tire, the tire-engaging part of said bottom surface extending the full axial width of said road-engaging surface of said tire and having a radius of longitudinal curvature greater than the radius of said road-engaging surface, and means for controlling the supply of air to and the exhaust of air from said cushions thereby to hold the brake shoes out of contact with said tires and for lowering the vehicle frame to lower the brake shoe carried thereby against said tires and to apply a predetermined braking pressure to the tires.

References Cited in the file of this patent

UNITED STATES PATENTS

| | | |
|---|---|---|
| 491,664 | Roberts et al. | Feb. 14, 1893 |
| 1,906,711 | Norton | May 2, 1933 |
| 2,738,034 | Levine | Mar. 13, 1956 |
| 2,742,301 | Pointer | Apr. 17, 1956 |
| 2,777,546 | Kelley | Jan. 15, 1957 |
| 2,810,458 | Troxell | Oct. 22, 1957 |
| 2,824,713 | Kelley | Feb. 25, 1958 |